United States Patent
Nikolskiy et al.

(10) Patent No.: US 11,948,325 B2
(45) Date of Patent: *Apr. 2, 2024

(54) DETERMINING ROTATION AXIS FROM X-RAY RADIOGRAPHS

(71) Applicant: James R. Glidewell Dental Ceramics, Inc., Newport Beach, CA (US)

(72) Inventors: Sergey Nikolskiy, Coto de Caza, CA (US); Fedor Chelnokov, Khimki (RU); Andrey Svistunov, Moscow (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,674

(22) Filed: Jan. 7, 2022

(65) Prior Publication Data
US 2022/0130068 A1  Apr. 28, 2022

Related U.S. Application Data

(63) Continuation of application No. 16/680,020, filed on Nov. 11, 2019, now Pat. No. 11,222,435.

(51) Int. Cl.
*G06T 7/70*   (2017.01)
(52) U.S. Cl.
CPC ...... *G06T 7/70* (2017.01); *G06T 2207/10081* (2013.01)
(58) Field of Classification Search
CPC ......... G06T 11/005; G06T 2207/10081; G06T 7/70; G06T 11/006; G06T 11/008; G06T 2207/10084; G06T 2207/10088; G06T 2207/10101; G06T 2207/10116
See application file for complete search history.

(56) References Cited

U.S. PATENT DOCUMENTS

| | | | |
|---|---|---|---|
| 2005/0113680 A1* | 5/2005 | Ikeda | G06T 7/0012 128/920 |
| 2006/0110068 A1* | 5/2006 | Luo | G06T 7/70 382/289 |
| 2006/0291612 A1 | 12/2006 | Nishide et al. | |
| 2010/0195893 A1* | 8/2010 | Fuchigami | A61B 5/02007 382/132 |
| 2013/0016125 A1 | 1/2013 | Mainguet | |
| 2013/0223587 A1 | 8/2013 | Moriyasu | |
| 2013/0243276 A1* | 9/2013 | Souza | G06T 7/194 382/128 |
| 2014/0169650 A1* | 6/2014 | Sakimoto | G06T 7/0012 382/131 |
| 2015/0221080 A1* | 8/2015 | Yamamoto | A61B 6/505 378/4 |

(Continued)

OTHER PUBLICATIONS

Uikyu JE et al., "Dental Cone-beam CT Reconstruction from Limited-angle View Data Based on Compressed-sensing (CS) Theory for Fast, Low-dose X-ray Imaging ",Apr. 7, 2014, Journal of the Korean Physical Society, vol. 64, No. 12, Jun. 2014, pp. 1907-1910.*

(Continued)

*Primary Examiner* — Omar S Ismail

(74) *Attorney, Agent, or Firm* — Charles Fowler

(57) ABSTRACT

A system and method of processing a CT scan includes receiving a plurality of radiographs and determining an axis of rotation per scan from the plurality of radiographs prior to CT reconstruction.

20 Claims, 19 Drawing Sheets

(56) References Cited

U.S. PATENT DOCUMENTS

| | | | |
|---|---|---|---|
| 2015/0305696 A1* | 10/2015 | Yamakawa | A61B 6/466 378/19 |
| 2017/0154413 A1* | 6/2017 | Yu | G06F 18/2135 |
| 2017/0294034 A1* | 10/2017 | Zhou | G06T 11/008 |
| 2017/0311918 A1* | 11/2017 | Qi | A61B 6/5235 |
| 2017/0345190 A1* | 11/2017 | Shi | G06T 7/45 |
| 2018/0132982 A1 | 5/2018 | Nikolskiy et al. | |
| 2019/0235100 A1 | 8/2019 | Kimmig | |
| 2021/0142505 A1 | 5/2021 | Nikolskiy et al. | |

OTHER PUBLICATIONS

Zhanli Hu, "Region-of-interest reconstruction for a cone-beam dental CT with a circular trajectory", Jan. 18, 2013,Nuclear Instruments and Methods in Physics Research A 708 (2013),pp. 39-43.*

P. Mozzo, "A new volumetric CT machine for dental imaging based on the cone-beam technique: preliminary results",Jun. 2, 1998 , Eur. Radiol. 8(1998), pp. 1559-1563.*

Timo Kiljunen, "Dental cone beam CT: A review",Oct. 23, 2015, Physica Medica 31 (2015),pp. 844-846,856-857.*

Carlos Flores-Mir, "Measurement accuracy and reliability of tooth length on conventional and CBCT reconstructed panoramic radiographs",Jan. 8, 2013, Dental Press J Orthod. Sep.-Oct. 2014; 19(5), pp. 45-48.*

International Application No. PCT/US20/59996, Notification of Transmittal of the International Search Report and the Written Opinion of the International Searching Authority, dated Feb. 4, 2021.

Yongsheng Pan et al., Automatic Detection of Rotational Centers Using GPU from Projection Data for micro-tomography in Synchrotron Radiation, Medical Imaging 2012: Physics of Medical Imaging, Proc. of SPIE vol. 8313, 831328 • © 2012 SPIE • CCC code: 1605-7422/12/$18 • doi: 10.1117/12.911561, proceedings. spiedigitallibrary.org on Nov. 23, 2016, in 9 pages.

Kai Yang et al., A geometric calibration method for cone beam CT systems, National Institutes of Health, NIH Public Access, publishe in final edited form as Med Phys. Jun. 2006; 33 (6): 1695-1706, in 40 pages.

Nghia T. Vo et al., Reliable method for calculating the center of rotation in parallel-beam tomography, Diamond Light Source, Harwell Science and Innovation Campus, Didcot, Oxfordshire, OX11 Ode, UK, published Jul. 30, 2014, vol. 22, No. 16, DOI: 10.1364/OE. 22.019078, Optic Express 19078, in 9 pages.

David Walter et al., Photon Counting and Energy Discriminating X-Ray Detectors—Benefits and Applications, 19th World Conference on Non-Destructive Testing 2016 in 10 pages.

Avinash C. Kak et al., Principles of Computerized Tomographic Imaging, The Institute of Electrical and Electronics Engineers, Inc., New York, in IEEE Press, 1988, 333 pages (Entire Book).

* cited by examiner

DETERMINING ROTATION AXIS FROM X-RAY RADIOGRAPHS

CROSS-REFERENCE TO RELATED APPLICATION

This application is a continuation of U.S. patent application Ser. No. 16/680,020 filed Nov. 11, 2019, the entirety of which is hereby incorporated by reference.

FIELD

The disclosure relates to CT scanning.

BACKGROUND

A computed tomography scan ("CT scan") typically involves placing a physical object on a rotating platform inside a CT scanner between an x-ray source and x-ray detector and rotating the object around a physical axis of rotation to generate radiographs from the x-rays detected by the detector. Conventionally, the CT scanner can tomographically reconstruct the radiographs into a 3D representation of the object scanned ("CT reconstruction"). One example of CT reconstruction can be found in, for example, in the publication *Principles of Computerized Tomographic Imaging* (A. C. Kak and Malcolm Slaney, *Principles of Computerized Tomographic Imaging*, IEEE Press, 1988), the entirety of which is incorporated by reference herein. Other types of CT reconstruction can also be performed.

Tomographic reconstruction can use information regarding the physical axis of rotation's location and orientation to perform CT reconstruction on each scan. Although the axis of rotation's location and orientation can be calibrated for all scans by scanning a specially designed artifact prior to scanning objects, this can, for example, be inefficient and time-consuming, slow down CT scanning, reduce the number of useful scans per day, and lack precision. Additionally, the same calibration is typically used for each scan, thereby not compensating for variations per scan.

SUMMARY

A computer-implemented method of processing a CT scan can include receiving a plurality of radiographs and determining an axis of rotation per scan from the plurality of radiographs prior to CT reconstruction.

A computer-implemented system of processing a CT scan can include a processor, a computer-readable storage medium comprising instructions executable by the processor to perform steps including receiving a plurality of radiographs and determining an axis of rotation per scan from the plurality of radiographs prior to CT reconstruction.

A non-transitory computer readable medium can include storing executable computer program instructions for processing a CT scan, the computer program instructions including instructions for receiving a plurality of radiographs and determining an axis of rotation per scan from the plurality of radiographs prior to CT reconstruction.

DETAILED DESCRIPTION

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Figure 1:
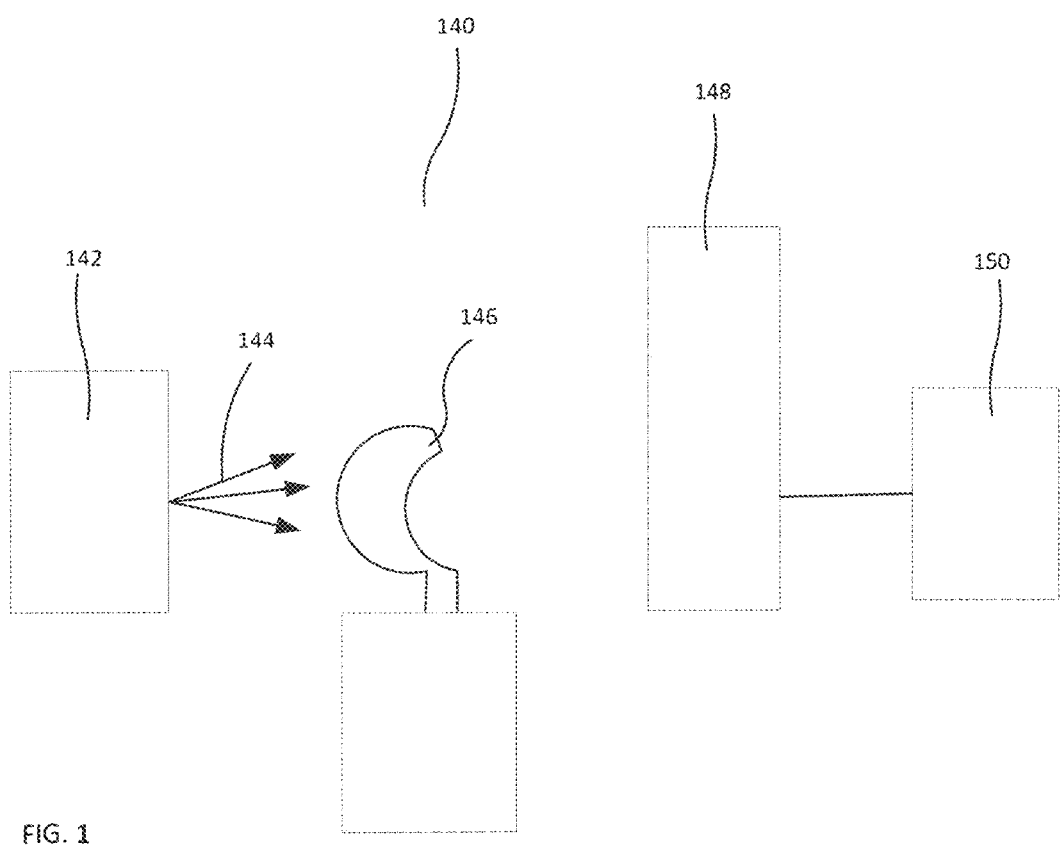
FIG. 1 is a schematic diagram of a computed tomography (CT) scanning system.

In one embodiment of the present disclosure, a computed tomography (CT) scanner uses x-rays to make a detailed image of an object. A plurality of such images are then combined to form a 3D model of the object. A schematic diagram of an example of a CT scanning system 140 is shown in FIG. 1. The CT scanning system 140 includes a source of x-ray radiation 142 that emits an x-ray beam 144. An object 146 being scanned is placed between the source 142 and an x-ray detector 148. In some embodiments, the object can be, for example, a triple-tray physical dental impression or any other type of physical dental impression. In some embodiments, for example, any other type of physical dental impression can be scanned. In some embodiments, the object can be any object that can, for example, fit in a CT scanning system and be penetrated by x-rays. The x-ray detector 148, in turn, is connected to a processor 150 that is configured to receive the information from the detector 148 and to convert the information into a digital image file. Those skilled in the art will recognize that the processor 150 may comprise one or more computers that may be directly connected to the detector, wirelessly connected, connected via a network, or otherwise in direct or indirect communication with the detector 148.

An example of a suitable scanning system 140 includes a Nikon Model XTH 255 CT Scanner (Metrology) which is commercially available from Nikon Corporation. The example scanning system includes a 225 kV microfocus x-ray source with a 3 μm focal spot size to provide high performance image acquisition and volume processing. The processor 150 may include a storage medium that is configured with instructions to manage the data collected by the scanning system. A particular scanning system is described for illustrative purposes; any type/brand of CT scanning system can be utilized.

Figure 2:
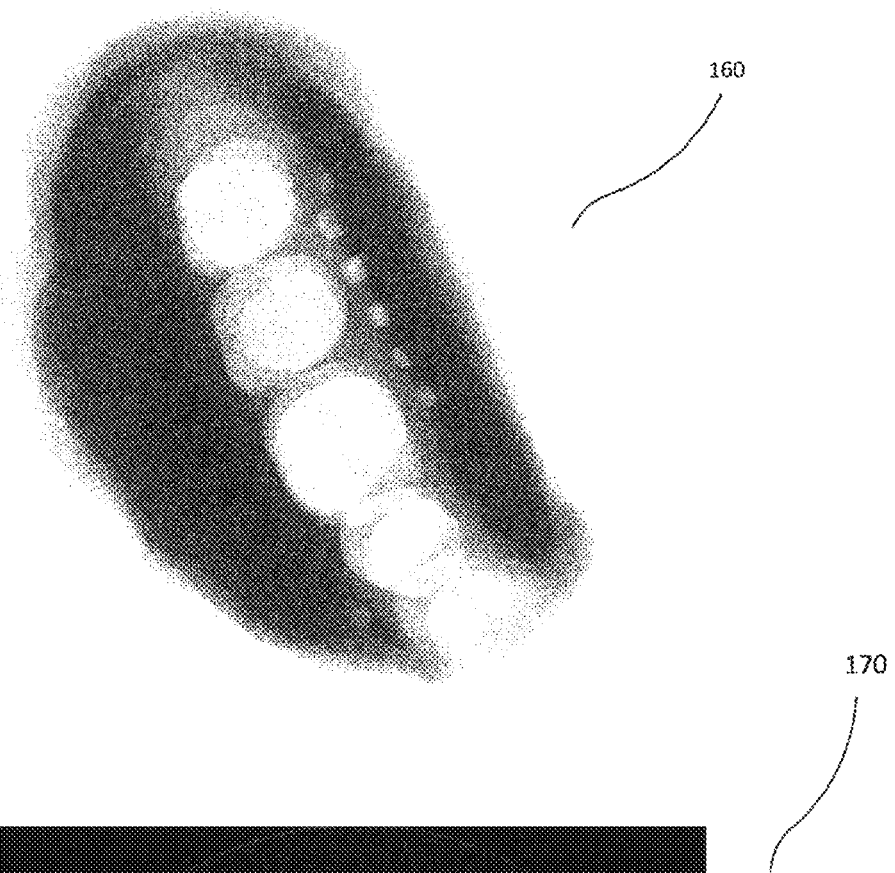
FIG. 2 is a 2-dimensional (2D) radiographic image of a dental impression tray containing a dental impression.

One example of CT scanning is described in U.S. Patent Application No. US20180132982A1 to Nikolskiy et al., which is hereby incorporated in its entirety by reference. As noted above, during operation of the scanning system 140, the object 146 is located between the x-ray source 142 and the x-ray detector 148. A series of images of the object 146 are collected by the processor 150 as the object 146 is rotated in place between the source 142 and the detector 146. An example of a single radiograph 160 is shown in FIG. 2. The radiograph 160 and all radiographs described herein are understood to be digital. In one embodiment, a series of 720 images are collected as the object 146 is rotated in place between the source 142 and the detector 148. In other embodiments, more images or fewer images may be collected as will be understood by those skilled in the art.

Figure 3:
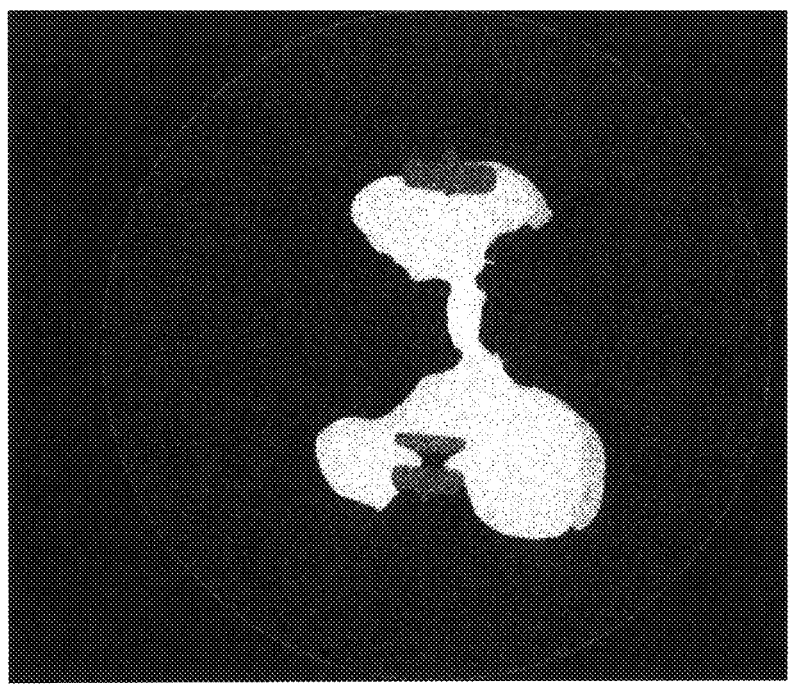
FIG. 3 is a cross-section of a 3-dimensional (3D) volumetric image.

The plurality of radiographs 160 of the object 146 are generated by and stored within a storage medium contained within the processor 150 of the scanning system 140, where they may be used by software contained within the processor to perform additional operations. For example, in an embodiment, the plurality of radiographs 160 can undergo tomographic reconstruction in order to generate a 3D virtual image 170 (see FIG. 3) from the plurality of 2D radiographs 160 generated by the scanning system 140. In the embodiment shown in FIG. 3, the 3D virtual image 170 is in the form of a volumetric image or volumetric density file (shown in cross-section in FIG. 3) that is generated from the plurality of radiographs 160 by way of a CT reconstruction algorithm associated with the scanning system 140. One type of CT reconstruction algorithm can be the filtered backprojection algorithm as described in the *Principles of Computerized Tomographic Imaging* publication. Other types of CT reconstruction algorithms known in the art can also be used.

Some embodiments can include a computer-implemented method of processing the radiographs 160 prior to CT reconstruction. The computer-implemented method can include, for example, receiving a plurality of radiographs and determining an axis of rotation from the plurality of radiographs, which can be unreconstructed radiographs in some embodiments, for example. In some embodiments, the computer-implemented method can perform one or more of the steps and/or features disclosed herein on unreconstructed radiographs, prior to CT reconstruction of one or more radiographs, for example. In some embodiments, the axis of rotation can be determined utilizing all of the radiographs from the CT scan, for example. In some embodiments, the axis of rotation can be determined from more than two radiographs, for example.

Figure 4:
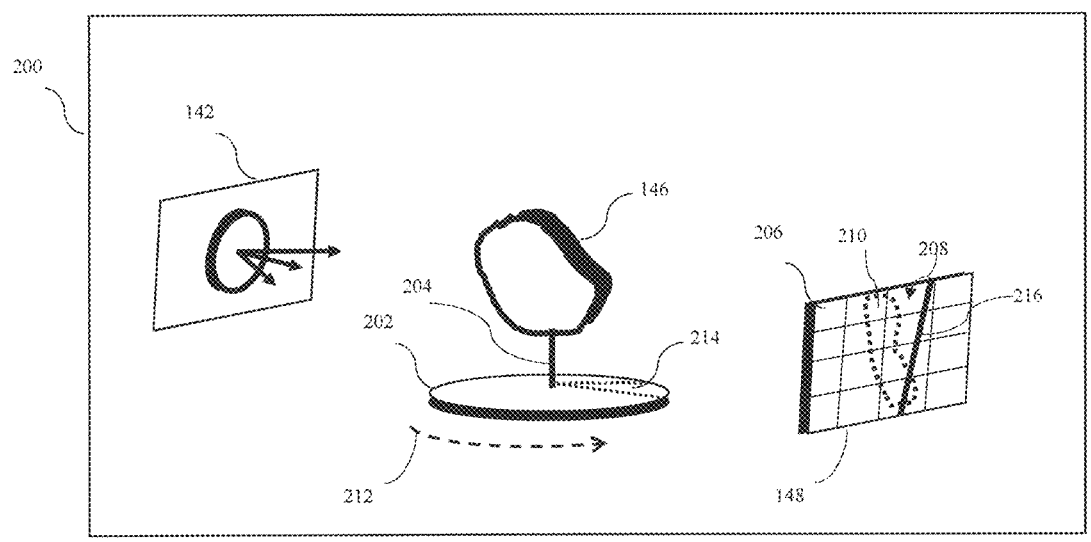
FIG. 4 is a schematic diagram of a CT scanning system.

FIG. 4 is an illustration of portions of a CT scanning system as discussed previously. Certain features of the CT scanning system are not shown for clarity. Other conventional CT scanning systems known in the art can also be utilized. Conventionally, the physical object 146 to be scanned is placed inside the CT scanner 200 on a rotational platform 202 between an x-ray source 142 and x-ray detector 148. The physical object 146 is exposed to x-rays generated by the x-ray source 142 that travel from the x-ray source 142 through the physical object 146 and to the x-ray detector 148. The x-ray detector 148 conventionally includes a detector pixel array 206 (row of detector pixels and column of detector pixels) which detects any incident x-rays to generate a radiograph 208, for example. In some embodiments, the x-ray detector 148 can include an array resolution of 1,000×1,000 pixels, for example. In some embodiments, the number of pixels can be at least 1 million pixels, for example. Other numbers of pixels can also be present. Other array resolutions are also possible. Conventionally, as the physical object 146 is rotated around a physical axis of rotation 204, the x-ray detector 148 detects x-rays incident on each pixel such as detector pixel 210 (and any other detector pixels) at each rotational position to generate multiple radiographs. The x-ray detector 148 can detect a photon count at each pixel for each radiograph generated at each rotational position. In some embodiments, the possible photon count can be any value. In some embodiments, the possible photon count range can be anywhere from 0 to 65535 photons per pixel, for example. Other photon count ranges per pixel are also possible. In some embodiments, the physical object 146 can be rotated 360 degrees once, and the direction of rotation 212 can be either clockwise or counterclockwise. Conventional/standard CT scanning systems allow setting the total number of radiographs desired prior to scanning. Conventionally, the x-ray detector 148 detects and stores a radiograph 208 every rotational degree 214 based on the total number of radiographs desired. For example, the rotational degree 214 can conventionally be determined as follows by the standard CT scanner 200: 360 degrees divided by the total number of radiographs, for example. In some embodiments, the total number of radiographs can be at least 500 radiographs, for example. The x-ray detector 148 conventionally detects and stores the radiograph 208 as well as the photon count for every detector pixel such as detector pixel 210. An example of conventional photon counting and x-ray detectors can be found, for example, in *Photon Counting and Energy Discriminating X-Ray Detectors—Benefits and Applications* (David WALTER, Uwe ZSCHERPEL, Uwe EWERT, BAM Bundesanstalt für Materialforschung und—prüfung, Berlin, Germany, 19$^{th}$ World Conference on Non-Destructive Testing, 2016), the entirety of which is incorporated by reference herein.

A single CT scan can therefore generate multiple radiographs in some embodiments in a single CT scan.

Figure 5:
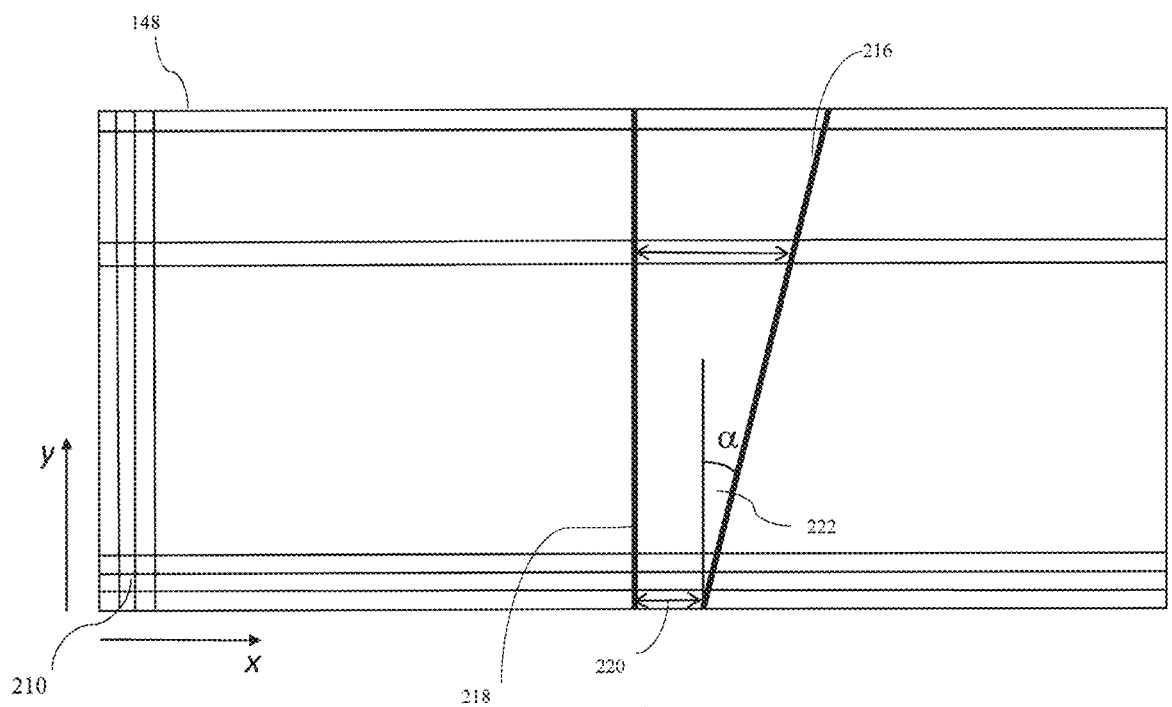
FIG. 5 is a schematic diagram example illustrating detector details.

An axis of rotation 216 in the multiple radiographs can be shifted and/or inclined from the horizontal center of the x-ray detector 148. FIG. 5 is an example illustration of a x-ray detector 148 having a horizontal detector center 218 corresponding the expected axis of rotation based on the ideally arranged physical axis of rotation 204. As illustrated in the figure, the axis of rotation 216 can be shifted to either side of the horizontal detector center 218 by an axis of rotation shift 220 and/or inclined from the horizontal detector center 218 by any degrees on either side of horizontal detector center 218 by an axis of rotation inclination angle 222. In some embodiments, the computer-implemented method can receive the multiple radiographs and determine the axis of rotation 216 from the multiple radiographs. This can provide, for example, determining the axis of rotation 216 per scan regardless of the arrangement of the physical axis of rotation 204.

Figure 6A:
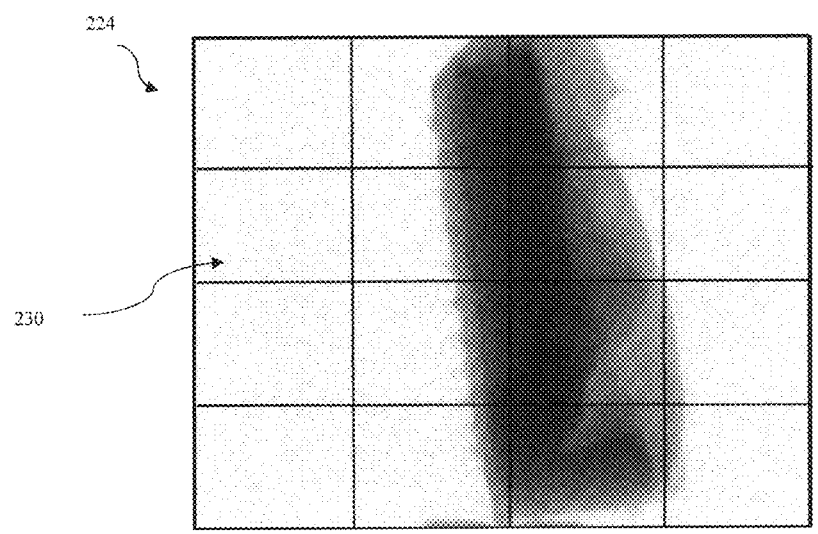
FIGS. 6(a)-6(c) are radiographic image examples with illustrated overlays of pixels.
Figure 6B:
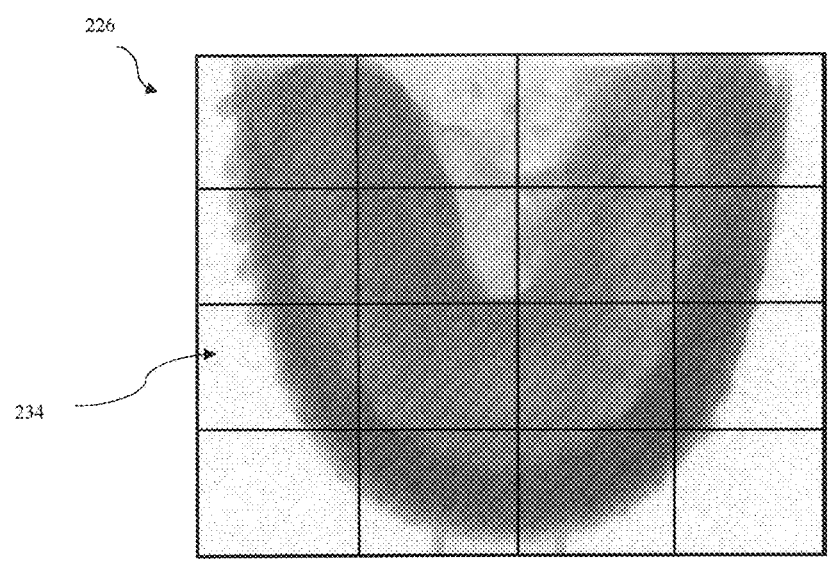
Figure 6C:
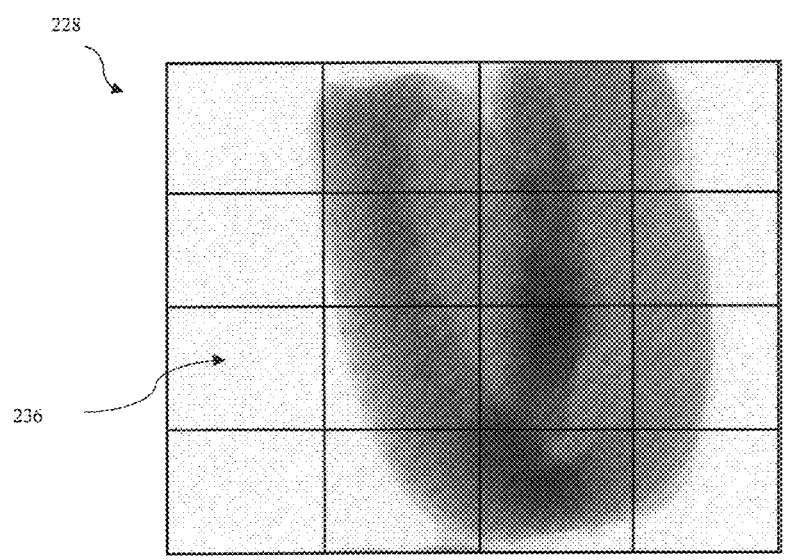
Figure 7:
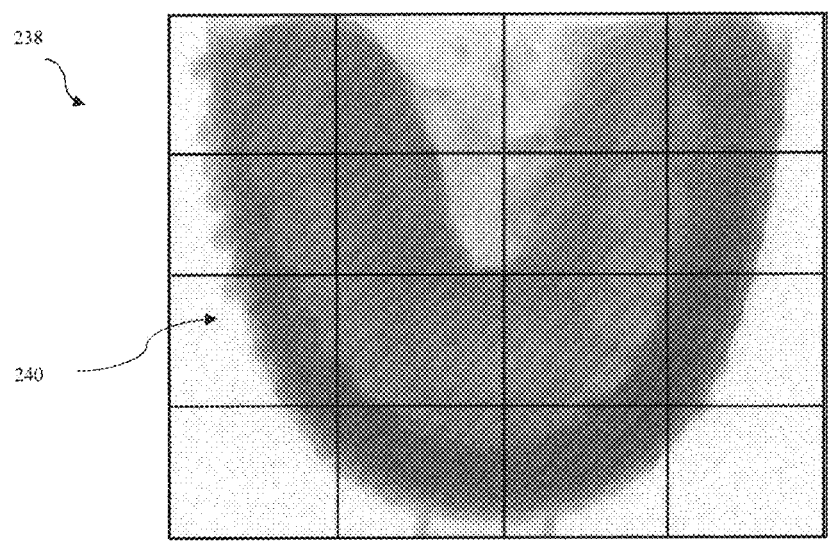
FIG. 7 is a 2D radiographic image example with an illustrated overlay of pixels.

In some embodiments, determining the axis of rotation 216 can include the computer-implemented method determining a representative pixel for each detector pixel from the multiple radiographs to generate a representative image. FIGS. 6(a)-6(c) illustrate examples of a first radiograph 224, a second radiograph 226, and a third radiograph 228, respectively, of the multiple radiographs. Three radiographs are shown for illustration purposes only; the multiple radiographs can include any number of radiographs, such as at least 500 radiographs, for example, in some embodiments. The first radiograph 224 can be the first radiograph pixels 230 detected at a first rotational position, the second radiograph 226 can be the second radiograph pixels 234 detected at a second rotational position, and the third radiograph 228 can be the third radiograph pixels 236 detected at a third rotational position, for example. The nth radiograph can be the nth radiograph pixels detected at a nth rotational position as the physical object 146 is rotated around the physical axis of rotation 204 from zero to a fixed number of degrees such as 360 degrees, in some embodiments, for example. FIG. 7 illustrates an example of a single radiograph 238 with a photon count at each of the radiograph pixels 240. The number of radiograph pixels shown is also for illustration purposes only and can be greater or smaller in value. In some embodiments, there can be 1,000 rows×1,000 columns of pixels, for example.

In some embodiments, the computer-implemented method can generate a representative image made up of representative pixels. In some embodiments, the computer-implemented method can generate the representative pixel of a particular detector pixel by determining a pixel average or a pixel sum of its corresponding radiograph pixels. For example, in some embodiments, the computer-implemented method can for a particular detector pixel receive photon counts of its corresponding radiograph pixels and determine a pixel average or a pixel sum of the photon counts. The computer-implemented method can repeat this for each particular detector pixel and generate a representative image.

Figure 8A:
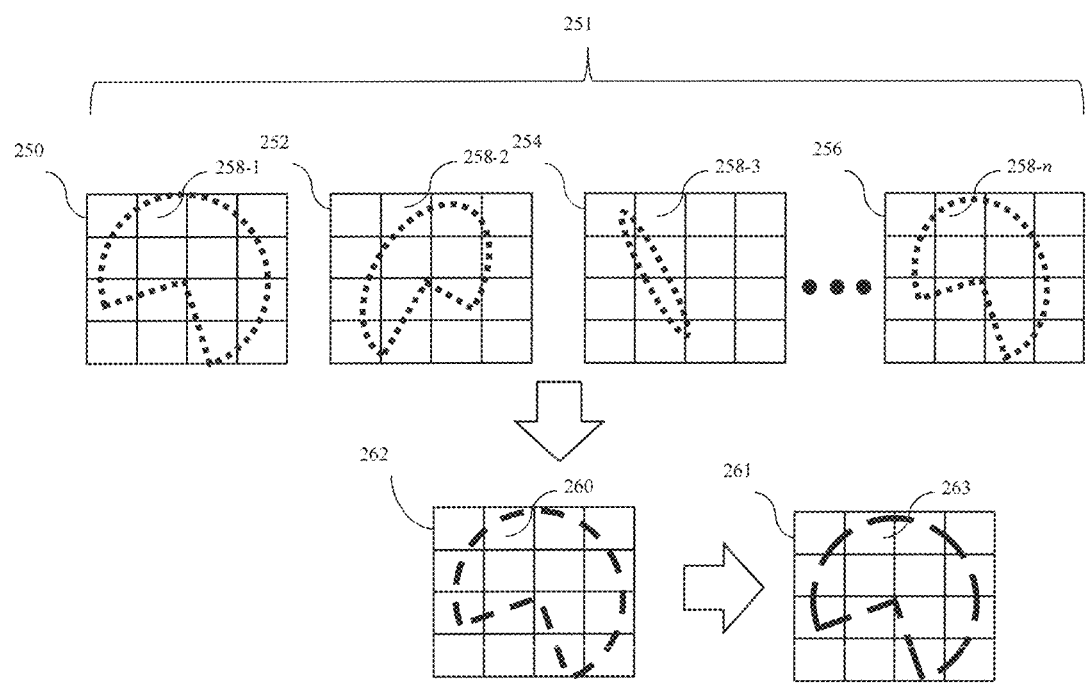
FIGS. 8(a)-8(b) are illustrations of an example of generating a representative image and filtering from multiple radiographs.

FIG. 8(A) illustrates one example of determining the representative pixel for each pixel across multiple radiographs. The figure illustrates multiple radiographs 251, which can include first radiograph 250, second radiograph 252, third radiograph 254, and nth radiograph 256, for example. In some embodiments, the number of radiographs can be at least 500, for example. Each radiograph pixel of each radiograph can include a photon count. In some embodiments, the computer-implemented method can determine a representative pixel from the photon counts of its corresponding radiograph pixels. Corresponding radiograph pixels can be radiograph pixels in the same pixel position (x,y) as the representative pixel being determined. For example, as illustrated in the figure, the computer-implemented method can determine a representative pixel 260 from the photon counts of its corresponding radiograph pixels 258-1, 258-2, 258-3 . . . 258-n. Radiograph pixels 258-1, 258-2, 258-3 . . . 258-n correspond to representative pixel 260 because they are in the same pixel position (x,y) as the representative pixel 260 across the multiple radiographs 251, for example.

In some embodiments, the computer-implemented method can generate the representative pixel by determining an average of the photon counts of its corresponding radiograph pixels. For example, the computer-implemented method can generate the representative pixel 260 by receiving and adding together the photon counts from the corresponding radiograph pixels 258-1, 258-2, 258-3 . . . 258-n of the multiple radiographs 251 and dividing the sum by the total number of radiographs in some embodiments. For example, if the multiple radiographs include 500 radiographs, then the computer-implemented method can receive from the x-ray detector a first photon count for radiograph pixel 258-1 from the first radiograph 250, a second photon count for radiograph pixel 258-2 from the second radiograph 252 through the nth photon count for radiograph pixel 258-n from the nth radiograph, which in this example would be the 500$^{th}$ radiograph pixel from the 500$^{th}$ radiograph. The computer-implemented method can generate the representative pixel 260 by summing the photon counts of radiograph pixel 258-1 through radiograph pixel-n from the 500 radiographs and dividing the sum by 500 in some embodiments to generate the representative pixel 260 in the example. The computer-implemented method can determine a representative pixel for every detector pixel in some embodiments.

In an alternative embodiment, the computer-implemented method can determine the representative pixel by determining a sum of all photon counts for the corresponding radiograph pixels, for example. In such an embodiment, for example, the computer-implemented method can generate the representative pixel 260 by summing all of the photon counts received for the corresponding radiograph pixels 258-1, 258-2, 258-3 . . . 258-n. In such an embodiment, if the multiple radiographs 251 includes 500 radiographs, for example, then the computer-implemented method can generate the representative pixel 260 by summing all of the photon counts of the corresponding radiograph pixels from the 500 radiographs.

In some embodiments, the computer-implemented method can determine the representative pixel from the raw photon count using any other suitable technique known in the art, for example.

In an alternative embodiment, the computer-implemented method can optionally first convert the photon count from each corresponding radiograph pixel using any suitable function. For example, one suitable function can convert the photon count from each corresponding radiograph pixel into an attenuation coefficient, for example. In some embodiments, the computer-implemented method can convert the photon count from each corresponding radiograph pixel into an attenuation coefficient and then determine the representative pixel by determining a pixel average or a pixel sum as described previously of the corresponding attenuation coefficients of the corresponding radiograph pixels for example.

In some embodiments, the computer-implemented method can receive a look-up table or other data structure containing empirically derived conversions from photon counts to attenuation coefficients. The computer-implemented method can determine the attenuation coefficient for each corresponding radiograph pixel by matching the photon count to the attenuation coefficient in the look-up table. The computer-implemented method can then store or associate the attenuation coefficient with the corresponding radiograph pixel. Conventional CT scanners can provide the empirical conversion values which can be dependent on the particular CT scanner's x-ray source 142 and the type of material used. In some embodiments, the look-up table can be stored in a configuration file or a variable received by the computer-implemented method, for example.

Alternatively, in some embodiments, the computer-implemented method can determine an attenuation coefficient a(x,y) theoretically for each corresponding radiograph pixel by converting the photon count c(x,y) in each pixel (x,y) of each radiograph as follows:

$$a(x,y)=\ln(I_0/c(x,y)) \text{ or } a(x,y)=\ln(I_0)-\ln(c(x,y))$$

where $I_0$ is a baseline photon count in the pixels of x-rays directly from the x-ray source 142, without passing through the physical object 146 which can in some embodiments, be the maximum possible photon count.

In some embodiments, the computer-implemented system can optionally determine attenuation coefficients empirically by receiving scanner coefficient values from the CT scanner and applying the values to a conversion function, for example. For example, the computer-implemented method can receive scanner coefficient values a,b,c,d,e, and f and apply the received scanner coefficient values to the conversion function $Y=a(b+cX+dX^2+eX^3+fX^4)$ to obtain each corresponding radiograph pixel's attenuation coefficient, where X is the attenuation coefficient of the pixel determined theoretically as described previously, Y is the attenuation coefficient to be obtained empirically, and a through f are the received scanner coefficient values. Other conversion functions can be used, and more or fewer coefficient values can be received. In one embodiment, the computer-implemented method can receive scanner coefficients such as a=1, b=0, c=0.75, d=0.25, e=0, f=0 for a Nikon CT scanner, for example. In another embodiment, the computer-implemented method can receive, scanner coefficients such as a=1, b=0, c=0.5, d=0.5, e=0, f=0 for a Nikon CT scanner, for example. The computer-implemented method can receive other scanner coefficient values and other CT scanner types and/or x-ray sources can be used. The scanner coefficients can be loaded by the computer-implemented method from a configuration file, for example in some embodiments. In some embodiments, the computer-implemented method can receive the scanner coefficients, calculate all attenuation coefficient values for photon counts (for example from 0 to the maximum possible photon count value) using the scanner coefficients, and store the photon count to attenuation coefficient conversions in a look up table or other data structure. In some embodiments, the computer-implemented method can store the look up table or other data structure in a configuration file, for example. In some embodiments, the computer-implemented method can load the configuration file as discussed previously. The conventionally provided empirical conversion can be based on the type of x-ray source 142 and the type of physical object 146 material being scanned, for example.

Figure 9:
FIG. 9 is an example of a radiographic image with attenuation coefficients.

FIG. 9 illustrates one example of single radiograph converted to a single attenuation coefficient image 242.

In some embodiments, the computer-implemented method can apply the conversion to every scan until changed by the user or other CT scanning system. In some embodiments, the computer-implemented method can determine attenuation coefficients using any other function or conversion known in the art.

Figure 10:
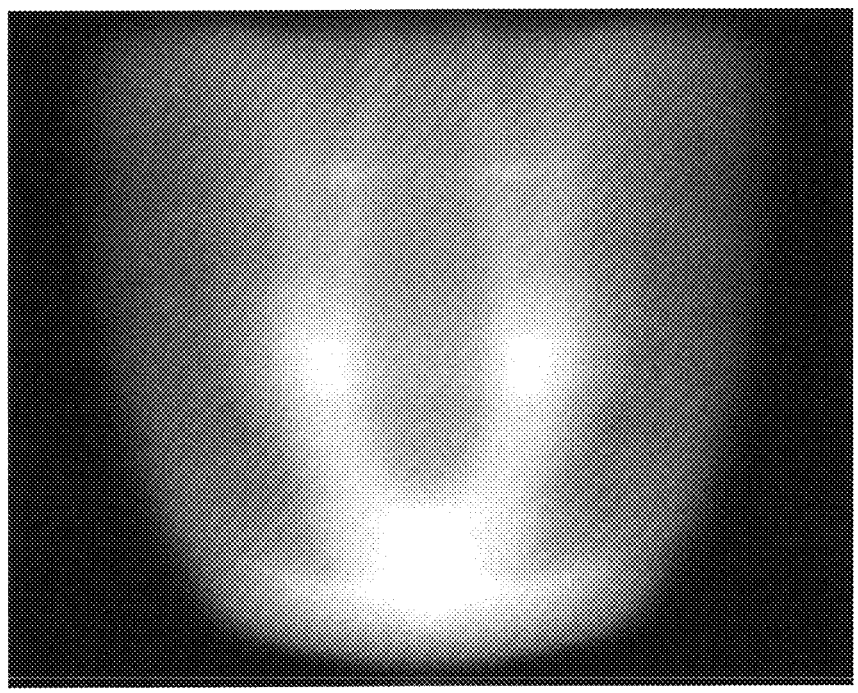
FIG. 10 is an example of a representative image.

The representative pixels—whether determined by the computer-implemented method by photon counts or attenuation coefficients and whether an average or sum—can together constitute the representative image, which can include representative image rows and columns in some embodiments, for example. FIG. 10 illustrates an example of a representative image 264 that includes all of the representative pixels in some embodiments. The computer-implemented method can determine for every detector pixel a representative pixel representing all of its corresponding radiograph pixels from that detector pixel in some embodiments. In some embodiments, the computer-implemented method can determine the representative pixels for only a subset of the detector pixels. In some embodiments, the computer-implemented method can determine a representative pixel from a subset of its corresponding radiograph pixels. FIG. 10 illustrates a representative image 264, for example, generated by the computer-implemented method in some embodiments. The computer-implemented method can determine each representative pixel by determining a pixel average or sum of the attenuation coefficients for each pixel as discussed previously with respect to photon counts, for example.

In some embodiments, the computer-implemented method can perform optional filtering on either the representative image or on each radiograph prior to generating the representative image. For example, the computer-implemented method can filter the representative image 262 from FIG. 8(A) to generate a filtered representative image 261, for example, made up of filtered representative image pixels such as filtered representative image pixel 263. In some embodiments, the representative image 262 can be an average or sum image. In some embodiments, the representative image 262 can be based on photon counts or attenuation coefficients or other suitable conversions, for example.

In some embodiments, the computer-implemented method can filter by representative image row, for example. In some embodiments, the computer-implemented method can apply a high frequency filter to each representative image row to determine one or more boundaries of the physical object for that row, for example. This can help identify object edge regions, for example, such as one or more object boundaries per representative image row. By applying a high frequency filter to each representative image row, the computer-implemented method can determine non-uniform areas and ignore uniform areas—i.e. non-boundary regions—within the representative image row. The computer-implemented can receive one or more representative image rows and perform a Fourier Transform on each representative image row until all of the representative image rows are transformed into the frequency domain. In some embodiments, the computer-implemented method can multiply a filter to each representative image row using filters known in the art such as, for example, a Ram-Lak filter, Shepp-Logan filter, Hanning filter, or any other filter conventionally known filter. For example, the computer-implemented method can apply a Ram-Lak filter $h(w)=|w|\Pi_N$, a Shepp-Logan filter $h(w)=|w|\Pi_N*\sin c(w\pi/N)$, a cosine filter $h(w)=|w|\Pi_N*\cos(w\pi/N)$, or the Hanning filter $h(w)=|w|\Pi_N*\cos^2(w\pi/N)$, where w is the frequency and $\Pi$ is the Fourier transform value at the frequency w, and N is the number of representative image columns. In some embodiments, the computer-implemented method can perform a convolution function instead of performing a Fourier Transform of each representative image row. The filters listed/provided are examples only. In some embodiments, the computer-implemented method can apply any other suitable filter known in the art to each representative image row prior to CT reconstruction in some embodiments, for example.

Figure 11:
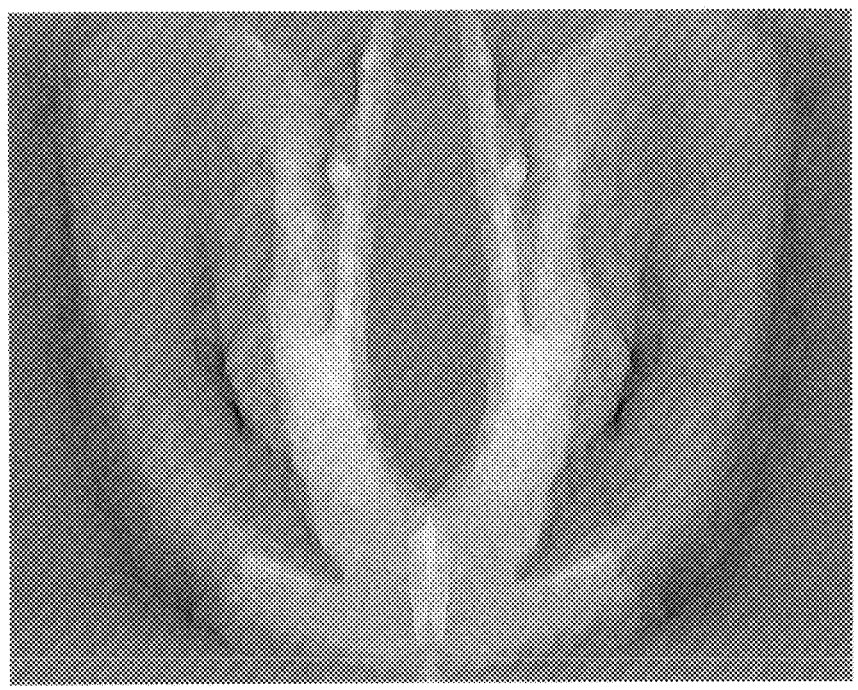
FIG. 11 is an example of a filtered image.

After applying the filter, the computer-implemented method can then perform an inverse Fourier transform of each representative image row to output a filtered representative image 261 with filtered representative image pixels such as filtered representative image pixel 263 as illustrated in FIG. 8(a). FIG. 11 illustrates a filtered representative image 268.

Figure 8B:
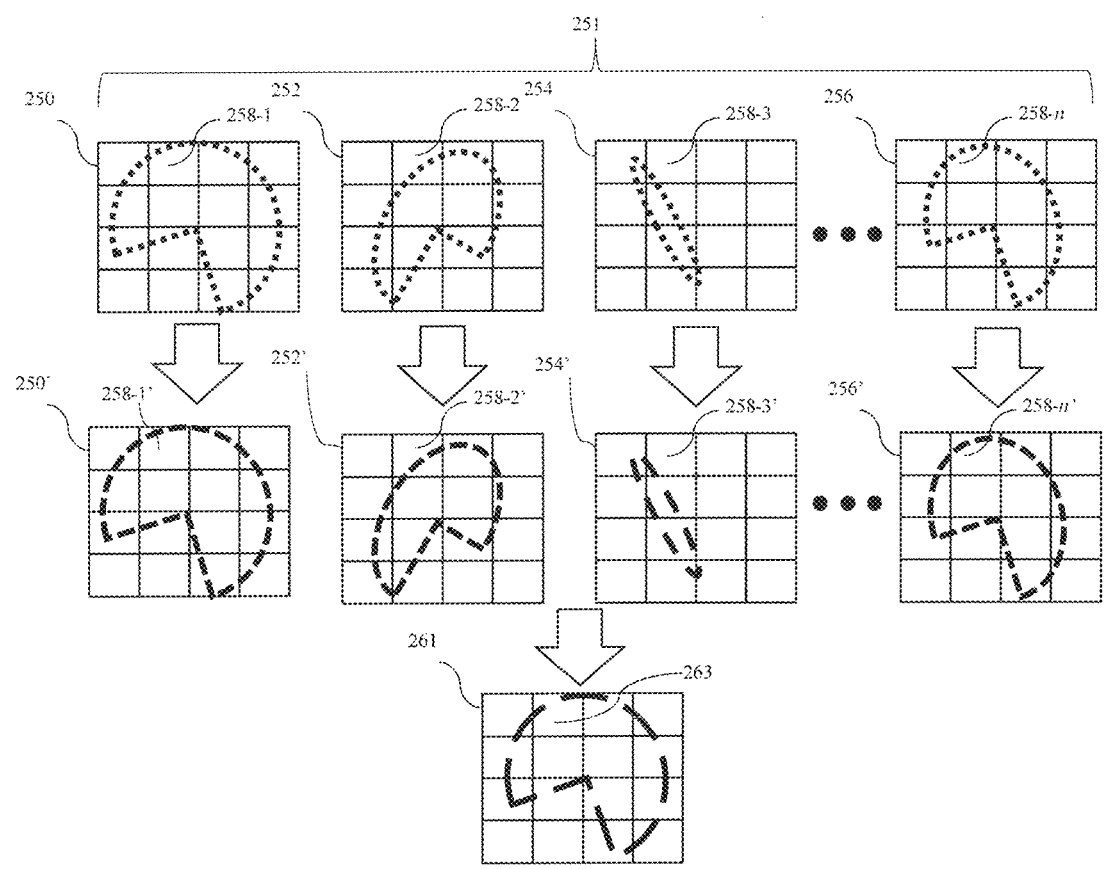

In an alternative embodiment, illustrated in FIG. 8(b), the computer-implemented method can filter radiographs first and then determine a representative image from the filtered radiographs. For example, the computer implemented method can receive the multiple radiographs 251. The computer-implemented method can filter each row of each radiograph 250, 252, 254, and 256 as discussed previously to generate filtered radiographs 250', 252', 254', and 256', for example. The computer-implemented method can then determine the filtered representative image pixel 263 as discussed previously by determining average or sum of the photon counts or of the attenuation coefficients of the corresponding filtered radiograph pixels. For example, the computer-implemented method can determine filtered representative pixel 263 by determining average or sum of the photon counts or the attenuation coefficients of its corresponding filtered radiograph pixels 258-1', 258-2', 258-3' . . . 258-n' rather than its corresponding radiograph pixels 258-1, 258-2, 258-3 . . . 258-n. The computer-implemented method can repeat the process for every filtered radiograph pixel to generate filtered representative image 261.

In some embodiments, the computer-implemented method can determine an axis of rotation from either the representative image or the filtered representative image. It will be understood that although reference is made to the representative image henceforth, the computer-implemented method can alternatively use the filtered representative image.

In some embodiments, determining the axis of rotation can include the computer-implemented method determining a position of line symmetry for each row of the representative image to generate a symmetrical position image. For example, as illustrated in FIGS. 12(a)-(d), the computer-implemented can receive a representative image 290 having a representative image row such 292, which can for example of discussion be described as f(x), x=0 . . . w−1, where x represents a pixel index of the representative image row 292 and w represents the representative image width 294, in pixels, of the representative image row 292. The computer-implemented method can determine for each row of the representative image rows 295 the position of line symmetry in some embodiments by, for example, determining s, minimizing the sum: $I(s)=\Sigma_{x=t}^{w-1-t}(f(x)-f(w-1-x-2s))^2$ where |t| is an integer number not smaller than 2 s, and is maximum shift in pixels on both sides of the horizontal center of the representative image array. A user can set the maximum shift in pixels t to any value such as 100, for example, in some embodiments. The value can, in some embodiments be received by the computer-implemented method from a configuration file, for example, or from any other source. The value can be set and/or received once initially and applied to multiple scans in some embodiments, for example, or set and/or received per scan in some embodiments, for example. The computer-implemented method can load pixel values from the representative image row 292 in the range [−t/2, t/2] with step ½, which is the shift on either side of the horizontal center of the detector. The computer-implemented method can determine I(s) for each s and determine the s that gives minimum I(s).

FIGS. 12(a)-(d) show illustrations of an example of the computer-implemented method determining the position line of symmetry. The figures are illustrations to describe one or more features. The representative image 290 shown in FIG. 12(a) includes a 4×4 representative image pixel array with a horizontal center 291. The figure and discussion are for illustration purposes only; the actual representative image pixel array can be any size, including, but not limited to 1,000×1,000 pixels in some embodiments, for example. The computer implemented method can receive a maximal pixel shift value t that can be set by a user in a configuration file, for example. The computer-implemented method can load the configuration file and determine the value oft in some embodiments, for example. The computer-implemented method can receive the maximal pixel shift value t from a user-selectable input or any another external source such as another program in some embodiments, for example. The maximal pixel shift value t can represent a maximum pixel width in which the computer-implemented method will search for the axis of rotation. In some embodiments, the maximum pixel shift can be, for example, 100 pixels. In such a case, the computer-implemented method can search 50 pixels on either side of the horizontal center 291. In some embodiments, the maximum pixel shift can be any value. In the present example, the maximum pixel shift value t is set to 1, for example. The computer-implemented method determines the total shift range to be from −t/2 to t/2 by ½ increment shifts on either side of the horizontal center 291. In the current example, the computer-implemented method can determine the set of shifts as {−½, 0, ½}.

In the present example, the computer-implemented method can receive a representative image 290, for example, that can include one or more representative image rows 295. In some embodiments, the computer-implemented method can receive a representative image row 292 of the representative image 290 and determine a representative image width 294(w) in pixels, such as 4 pixels, for example. The representative image row 292 can include row pixels f(0) through f(w), where w is the representative image width 294. In the present example, the representative image row 292 includes row pixels f(0) through f(3). Each row pixel can include photon counts or attenuation coefficients in some embodiments as discussed previously. In some embodiments, the photon counts or attenuation coefficients can be filtered as discussed previously or unfiltered. As illustrated in FIG. 12(b), the computer-implemented method can determine a representative image mirror row 293 of the representative image row 292. The computer-implemented method can arrange the pixels in the representative image mirror row 293 to be in reverse order of the pixels in the representative image row 292. Thus, for example, the first pixel 298 of the representative image row 292 is the last pixel 299 of representative image mirror row 294. The remaining pixels in the representative image mirror row 293 are similarly arranged in reverse order with respect to the representative image row 292 as illustrated in the figure.

As illustrated in the example shown in FIG. 12(b), the computer-implemented method can determine I(0), that is, the value at zero shift (s=0). The computer-implemented method determines which pixels of the representative image row 292 to compare to which pixels of the representative image mirror row 293. For example, since the maximum shift range t received by the computer-implemented method is set to 1, the computer-implemented method starts with representative image row 292 index x=1, which is representative image row 292 row pixel f(1). The computer-implemented method can determine which representative image mirror row 293 row pixel to compare to by determining f(w−1−x−2 s). For example, with x=1, the computer-implemented method determines representative image mirror row pixel f(2). Next, the computer-implemented method determines the difference between representative image row 292 pixel f(1) and the representative image mirror row 293 pixel f(2) and squares the difference to determine the difference at x=1. The computer-implemented method then increments x to x=2 to the next pixel of the representative image row 292 which is radiograph row pixel f(2) and the next pixel of the representative image mirror row 293, which is representative image mirror row pixel f(1), and determines the difference between these row pixels and squares the difference to determine the difference at x=2. The computer-implemented method increments x until x=w−1−t. The computer-implemented method adds the results of the differences at x=1 and x=2. The computer-implemented method in this manner can determine $I(0)=(f(1)-f(2))^2+(f(2)-f(1))^2$.

Figure 12A:
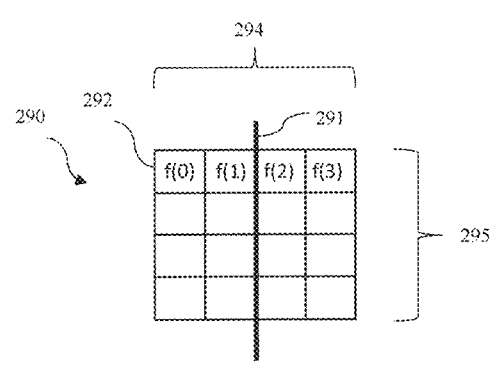
FIGS. 12(a)-12(d) are schematic diagrams illustrating examples of determining line symmetry.
Figure 12B:
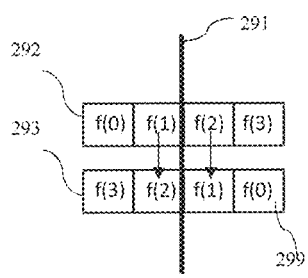
Figure 12C:
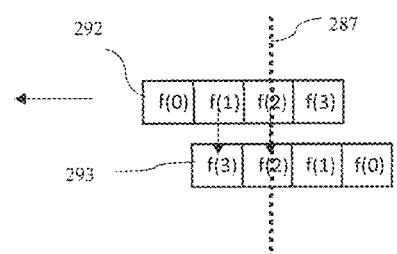
Figure 12D:
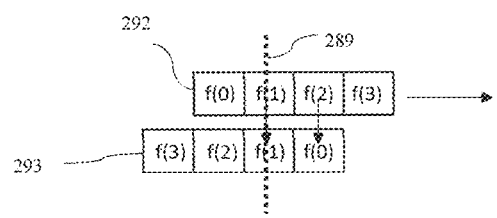

In FIG. 12(c), the computer-implemented method can similarly determine I(−½), that is, the value at s=½, or −½ shift for representative image row 292, representative image mirror row 293, and a hypothetical center of symmetry 287 for the given shift value s. The computer-implemented method can determine the value at s=−½ as $I(-½)=(f(1)-f(3))^2+(f(2)-f(2))^2$ or simply $(f(1)-f(3))^2$. In FIG. 12(d), the computer-implemented method can determine I(+½), that is, the value at +½ for representative image row 292, representative image mirror row 293, and a hypothetical center of symmetry 289 for the given shift value s. The computer-implemented method based on the previously described formula that $I(+½)=(f(1)-f(1))^2+(f(2)-f(0))^2$ or simply $(f(2)-f(0))^2$ The computer-implemented method can repeat this for every row in the representative image in some embodiments, for example.

In some embodiments, the computer-implemented method can compare corresponding representative image pixel values as described at positions in the representative image row 292 itself without generating a representative image mirror row 293. For example, the computer-implemented method can determine $I(0)=(f(1)-f(2))^2+(f(2)-f(1))^2$, $I(-½)=(f(1)-f(3))^2+(f(2)-f(2))^2$ or simply $(f(1)-f(3))^2$, and $I(+½)=(f(1)-f(1))^2+(f(2)-f(0))^2$ or simply $(f(2)-f(0))^2$ using values in those pixel positions of the representative image row 292 itself. The computer-implemented method can repeat this for every row in the representative image in some embodiments, for example.

The computer-implemented method can determine all I(s) values for all rows in the representative image pixel array 290 in some embodiments. Because the horizontal center 291 can be between pixels for odd numbered representative image pixel arrays, for example, the computer-implemented method can determine the symmetrical pixel to sub-pixel resolution in some embodiments. For example, the resolution can be ½ pixel in some embodiments.

Once the computer-implemented method determines all I(s) values based on the user-selected value of the maximum pixel shift for each representative image row in the representative image 290 in FIG. 12(a), the computer-implemented method can determine the minimum value of I(s) for each representative image row of the representative image 290, for example. In some embodiments, the computer-implemented method can determine all I(s) values for all of the representative image rows and then determine the minimum I(s) for each row. In some embodiments, the computer-implemented can determine all I(s) values for a particular representative image row such as representative image row 292 and then determine the minimum I(s) for that particular representative image row before moving on to the next representative image row to determine the next representative image row's I(s) values and the next representative image row's minimum I(s). The computer-implemented method can determine each representative image row's minimum I(s) by considering I(s) at a set number of selected points. In some embodiments, the computer-implemented method can receive the number of selected points to consider from a configuration file editable by a user, for example, or from any external source, such as another computer program. In some embodiments, the computer-implemented method can, for example, consider 5 points of the points maximum pixel shift range t such as, for example, selected points s−1, s−½, s, s+½, s+1. The computer-implemented method can evaluate more or fewer selected points. In some embodiments, the computer-implemented method can fit a parabola to values at the selected points using quadratic least square regression known in the art, for example. The computer-implemented method can determine the minimum of the parabola as s and output a sub-pixel resolution of the position of line symmetry in each representative image row in some embodiments.

Figure 13:
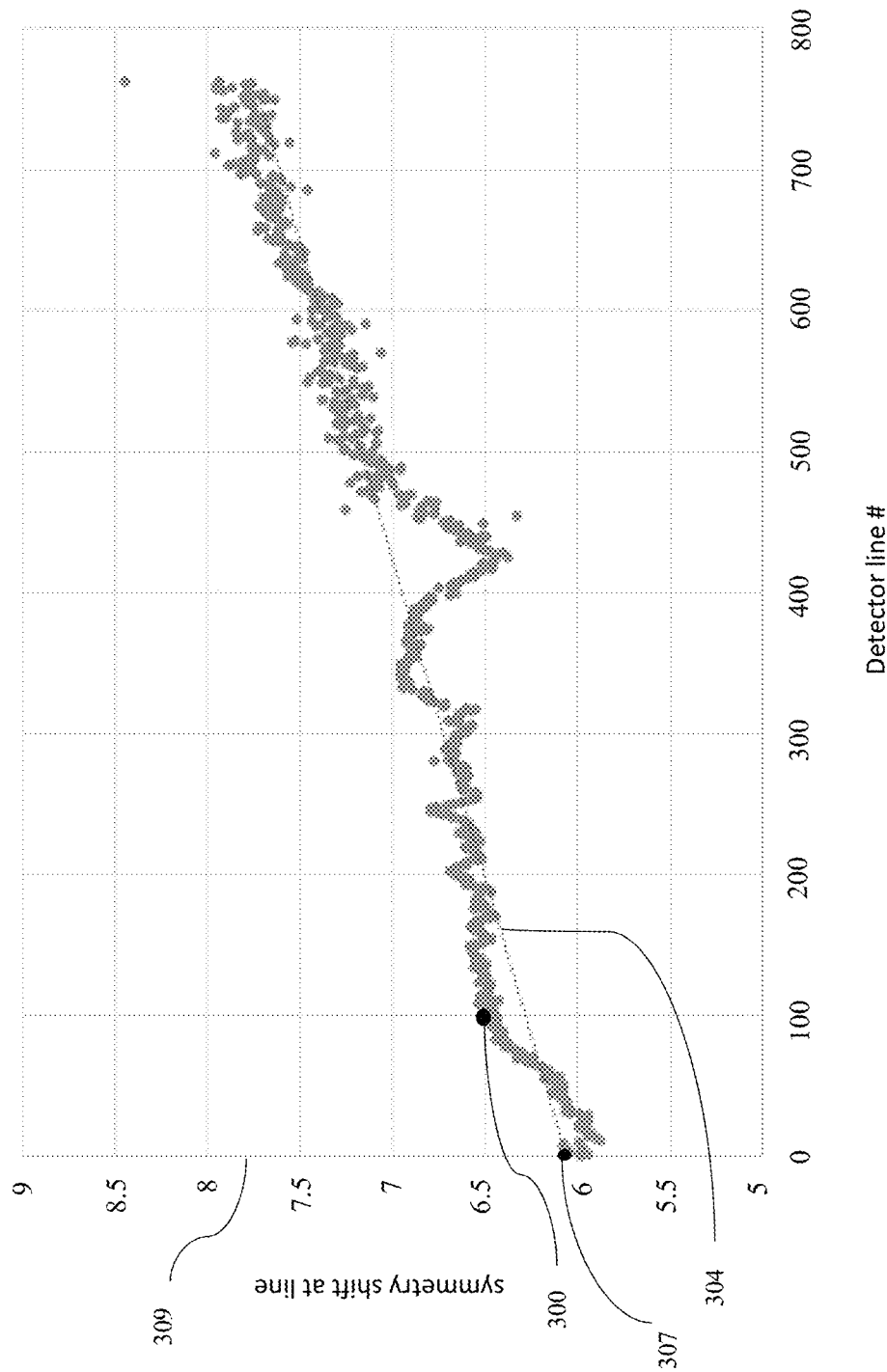
FIG. 13 is a graph illustrating an example of determining a best line fit to determine the axis of rotation.

In some embodiments, the computer-implemented method can determine the axis of rotation by, for example, determining a best line fit through the plurality of line symmetrical positions. FIG. 13 illustrates an example of a data point 300 whose position of line symmetry value is for example 6.5 at detector line number 100 for example. The computer-implemented method can, by using best line fit or another technique known in the art, find the shift and orientation of the axis of rotation, for example. In some embodiments, the computer-implemented method can determine the best line fit 304 by performing linear regression, for example on the positions of line symmetry. The computer-implemented method can perform linear regression as follows:

In some embodiments, the computer-implemented method defines an axis of rotation shift at line 0 as $S_0$, for example, and the axis of rotation inclination angle of the axis as $\alpha$, for example. The computer-implemented method can determine linear regression coefficients $S_0$ and $u=\tan \alpha$ best approximating overdetermined system in some embodiments as follows:

$$S_0+u*y=s(y), y=0 \ldots h-1$$

In some embodiments, the weight w(y) of the equation for line y in the overdetermined system can be equal to the sum of absolute values in this line of the filtered average image. This can provide very small relative weights to the lines where there is no object depicted, and where symmetry cannot be reliably found, for example. In the example of FIG. 13, $S_0$ can be, for example, where the best fit line 304 intersects the axis 309, which can correspond to, for example, line zero of the detector, which in the example figure can be at position 307.

In some embodiments, the computer-implemented method can provide an axis of rotation as an axis of rotation shift $S_0$ and an axis of rotation inclination angle $\alpha$, for example. In some embodiments, the axis of rotation shift $S_0$ can be sub-pixel, for example. This can be used, for example, to provide the axis of rotation shift $S_0$ and axis of rotation inclination angle $\alpha$ in some embodiments to CT reconstruction algorithms, for example. In some embodiments, the computer-implemented method can provide the axis of rotation location and inclination angle $\alpha$ and/or u.

Some embodiments include a processing system for creating a digital model from a CT scan, including: a processor, a computer-readable storage medium including instructions executable by the processor to perform steps including: receiving a plurality of radiographs and determining an axis of rotation per scan from the plurality of radiographs.

Figure 14:
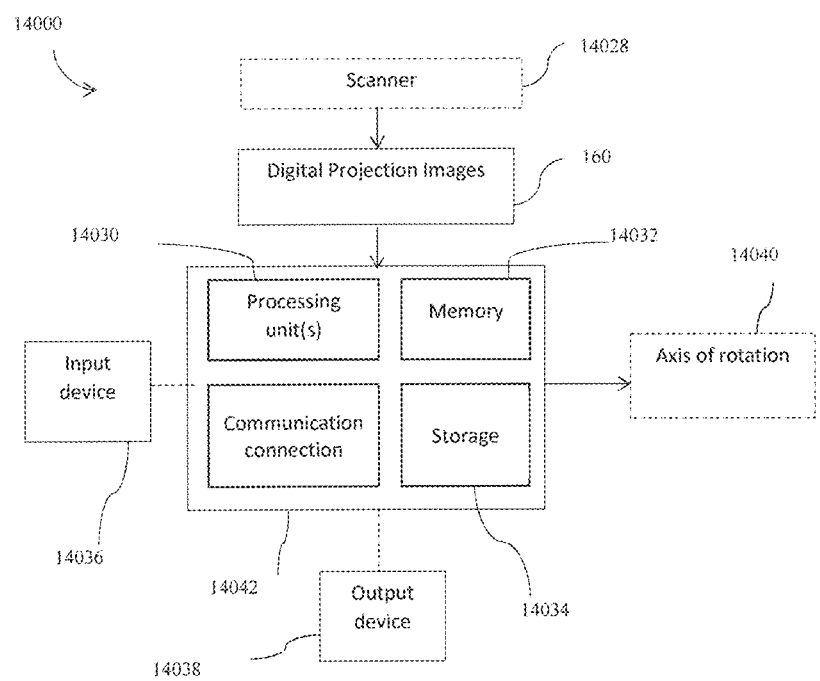
FIG. 14 is a schematic diagram illustrating an example of a system in some embodiments.

FIG. 14 illustrates a processing system 14000 in some embodiments. The system 14000 can include a processor 14030, computer-readable storage medium 14034 having instructions executable by the processor to perform steps described in the present disclosure. The digital object can optionally be provided by an optional scanner 14028, for example. The system 14000 can provide an axis of symmetry 14040.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

At least one advantage in some embodiments of one or more features recited herein can include, for example, determining the axis of rotation per each scan. This can, for example, provide for a more accurate determination of the axis of rotation by taking into account any per scan shifts that can occur rather than applying a general calibration to all scans, for example. At least one advantage of one or more features as recited herein can include bypassing conventional calibration of the scan with an artifact and/or calibrating the CT scanner to adjust for an axis of rotation shift to one setting for all scans, for example, which takes additional time and scanner occupation, does not take into account per scan variations. Accordingly, at least one advantage can include improved speed, accuracy, and efficiency in determining the axis of rotation, for example. At least one advantage can include higher quality reconstruction of x-ray scans, which can depend on a precise location of the axis of rotation, for example. At least one advantage can include, for example, determining the axis of rotation directly from the scan for each scan, for example. At least one advantage can include, for example, providing a sub-pixel axis of rotation (and/or shift). This can improve the accuracy of the determined axis of rotation, for example. At least one advantage in some embodiments can include, for example, considering most or all of the unreconstructed radiographs from the scan, for example. This can lead to a faster, more reliable determination of the axis of rotation, for example. Another advantage can include determining the axis of rotation prior to 3D reconstruction, which can be computationally expensive. Determining the axis prior to 3D reconstruction can, for example, improve speed and efficiency of determining the axis of rotation in some embodiments, for example.

EXAMPLES

Figure 15:
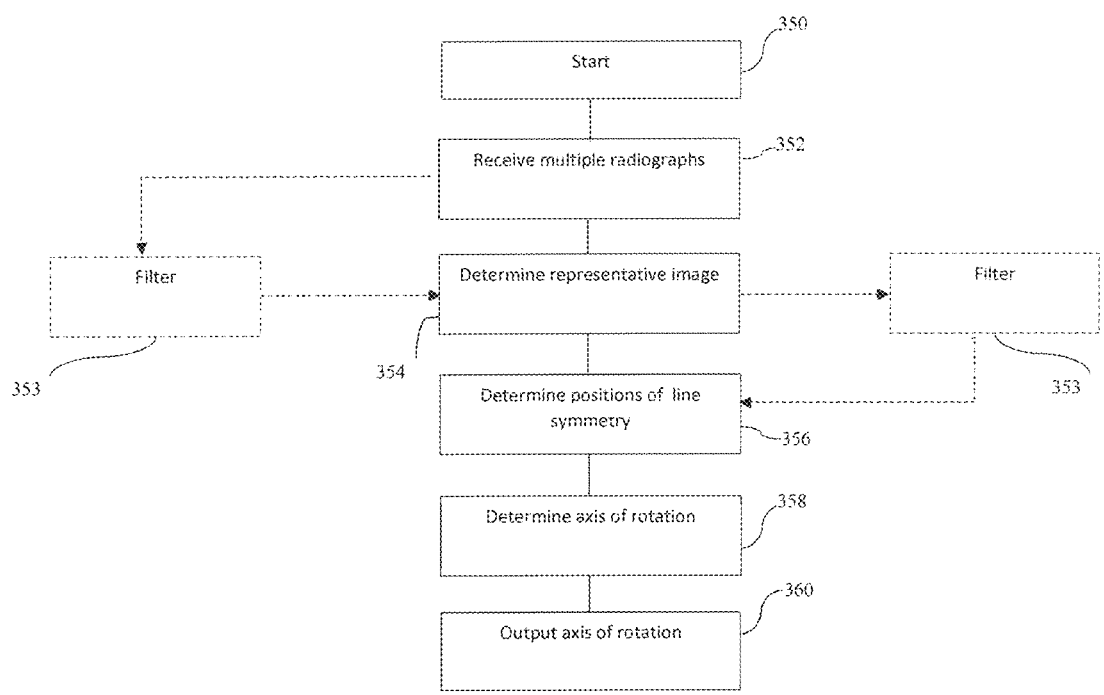
FIG. 15 is a flow diagram illustrating an example of a computer-implemented method in some embodiments.

FIG. 15 illustrates an example of one or more features in some embodiments. For example, the computer-implemented method can start at 350, receive multiple radiographs images at 352, determine a representative image at 354, determine positions of line symmetry at 356 and determine axis of rotation at 358. In some embodiments, the computer-implemented method can output the axis of rotation at 360. In some embodiments, the computer-implemented method can optionally filter at 353 either the multiple radiographs or the representative image. Upon optionally filtering at 353 the multiple radiographs, the computer implemented method can determine the representative image at 354, for example. Upon optionally filtering the representative image at 353, the computer-implemented method can determine positions of line symmetry at 356, for example. In some embodiments, the multiple radiographs can be raw photon counts, for example, or attenuation coefficients, for example. In some embodiments, the representative image can be an average image or a sum image, for example.

In another example, a computer-implemented method of processing a CT scan can include receiving multiple radiographs at 352 and determining an axis of rotation per scan from the multiple radiographs prior to CT reconstruction, for example. Determining the axis of rotation can include, for example, determining a representative pixel from the multiple radiographs to generate a representative image and determining the axis of rotation from the representative pixel. Determining the axis of rotation can include, for example, determining a position of line symmetry from the representative pixel to generate a symmetrical position image. The symmetrical position image can include, for example, multiple line symmetrical positions, each of the line symmetrical positions comprising a position of line symmetry. Determining the axis of rotation can include, for example determining a best line fit through the plurality of line symmetrical positions. Determining the axis of rotation can include, for example receiving a photon count of each pixel of each of the multiple radiographs. The computer-implemented method can further include determining a total pixel attenuation coefficient from the photon count for each pixel of each of the multiple radiographs. Determining the axis of rotation can include, for example filtering each radiograph row of each of the multiple radiographs. The computer-implemented method can further include filtering each representative image row.

In another example, a computer-implemented system of processing a CT scan can include, for example, a processor, a computer-readable storage medium can include instructions executable by the processor to perform steps comprising: receiving multiple radiographs and determining an axis of rotation per scan from the multiple radiographs, prior to CT reconstruction. Determining an axis of rotation can include, for example: determining a representative pixel for each pixel from the multiple radiographs to generate a representative image; and determining an axis of rotation from the representative pixel. Determining the axis of rotation can include, for example determining a position of line symmetry from the representative pixel to generate a symmetrical position image. The symmetrical position image can include, for example multiple line symmetrical positions, each of the line symmetrical positions comprising a position of line symmetry. Determining the axis of rotation can include, for example determining a best line fit through the multiple line symmetrical positions. Determining the axis of rotation can include, for example receiving a photon count of each pixel of each of the multiple radiographs. The system can additionally include determining a total pixel attenuation coefficient from the photon count for each pixel of each of the multiple radiographs. Determining the axis of rotation can include, for example filtering each radiograph row of each of the multiple radiographs. The system can further include filtering each representative image row.

In another example, a non-transitory computer readable medium storing executable computer program instructions for processing a CT scan, the computer program instructions can include instructions for: receiving multiple radiographs; and determining an axis of rotation per scan from the multiple radiographs prior to CT reconstruction. Determining an axis of rotation can include, for example: determining a representative pixel for each pixel from the multiple radiographs to generate a representative image and determining the axis of rotation from the representative pixel.

What is claimed is:

1. A computer-implemented method of processing a CT scan, comprising:
   receiving a plurality of radiographs of a dental impression;
   determining an axis of rotation per scan from the plurality of radiographs of the dental impression prior to CT reconstruction, wherein determining an axis of rotation comprises determining an axis of rotation shift and an axis of rotation inclination angle; and
   providing the axis of rotation shift and the axis of rotation inclination angle to CT reconstruction algorithms.

2. The method of claim 1, wherein determining the axis of rotation comprises:
   determining a representative pixel from the plurality of radiographs to generate a representative image; and
   determining the axis of rotation from the representative pixel.

3. The method of claim 2, wherein determining the axis of rotation comprises determining a position of line symmetry from the representative pixel to generate a symmetrical position image.

4. The method of claim 3, wherein the symmetrical position image comprises a plurality of line symmetrical positions, each of the line symmetrical positions comprising a position of line symmetry.

5. The method of claim 4, wherein determining the axis of rotation comprises determining a best line fit through the plurality of line symmetrical positions.

6. The method of claim 1, wherein determining the axis of rotation comprises receiving a photon count of each pixel of each of the plurality of radiographs.

7. The method of claim 6, further comprising determining a total pixel attenuation coefficient from the photon count for each pixel of each of the plurality of radiographs.

8. The method of claim 1, wherein determining the axis of rotation comprises filtering each radiograph row of each of the plurality of radiographs.

9. The method of claim 2, further comprising filtering each representative image row.

10. A computer-implemented system of processing a CT scan, comprising:
    a processor;
    a computer-readable storage medium comprising instructions executable by the processor to perform steps comprising:
    receiving a plurality of radiographs of a dental impression;
    determining an axis of rotation per scan from the plurality of radiographs of the dental impression prior to CT reconstruction, wherein determining an axis of rotation comprises determining an axis of rotation shift and an axis of rotation inclination angle; and
    providing the axis of rotation shift and the axis of rotation inclination angle to CT reconstruction algorithms.

11. The system of claim 10, wherein determining an axis of rotation comprises:
    determining a representative pixel for each pixel from the plurality of radiographs to generate a representative image; and
    determining an axis of rotation from the representative pixel.

12. The system of claim 11, wherein determining the axis of rotation comprises determining a position of line symmetry from the representative pixel to generate a symmetrical position image.

13. The system of claim 12, wherein the symmetrical position image comprises a plurality of line symmetrical positions, each of the line symmetrical positions comprising a position of line symmetry.

14. The system of claim 13, wherein determining the axis of rotation comprises determining a best line fit through the plurality of line symmetrical positions.

15. The system of claim 10, wherein determining the axis of rotation comprises receiving a photon count of each pixel of each of the plurality of radiographs.

16. The system of claim 15, further comprising determining a total pixel attenuation coefficient from the photon count for each pixel of each of the plurality of radiographs.

17. The system of claim 10, wherein determining the axis of rotation comprises filtering each radiograph row of each of the plurality of radiographs.

18. The system of claim 16, further comprising filtering each representative image row.

19. A non-transitory computer readable medium storing executable computer program instructions for processing a CT scan, the computer program instructions comprising instructions for:
    receiving a plurality of radiographs of a dental impression;
    determining an axis of rotation per scan from the plurality of radiographs of the dental impression prior to CT reconstruction, wherein determining an axis of rotation comprises determining an axis of rotation shift and an axis of rotation inclination angle; and
    providing the axis of rotation shift and the axis of rotation inclination angle to CT reconstruction algorithms.

20. The medium of claim 19, wherein determining an axis of rotation comprises:
    determining a representative pixel for each pixel from the plurality of radiographs to generate a representative image; and
    determining the axis of rotation from the representative pixel.

* * * * *